Aug. 8, 1933.  W. L. HAWKINS  1,921,225
SPARE WHEEL LOCK
Filed Sept. 24, 1930
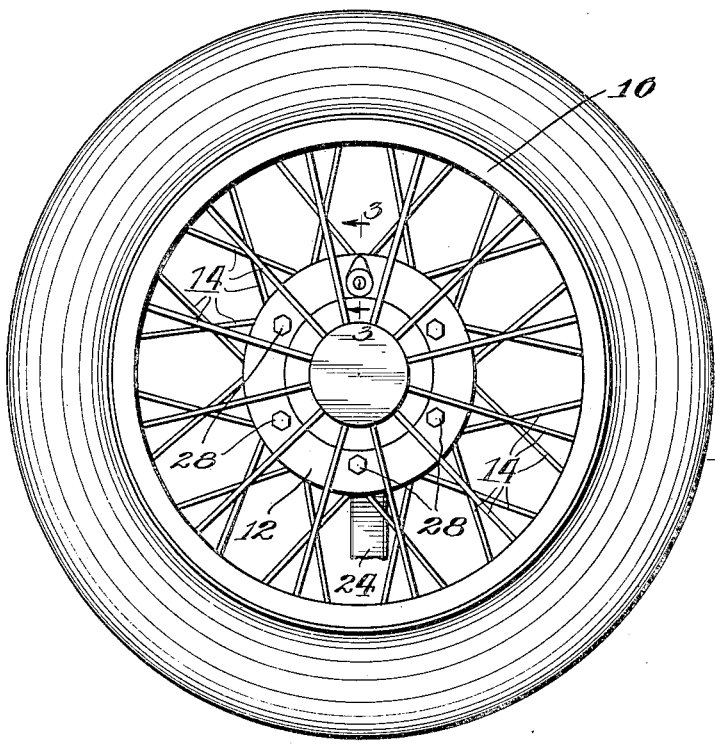
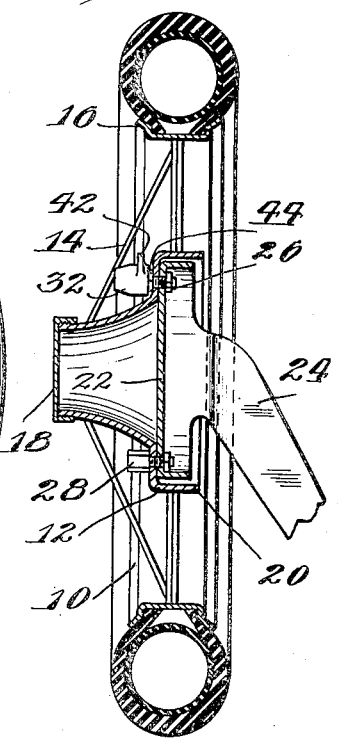
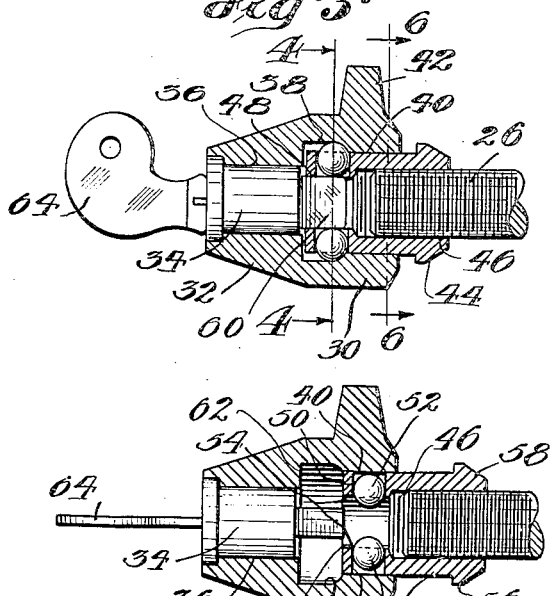
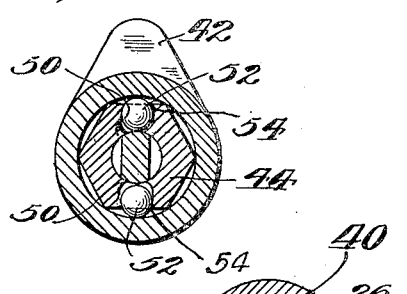
INVENTOR
Walter L. Hawkins
By Williams, Bradbury,
McCaleb & Hinkle ATTORNEYS Patented Aug. 8, 1933

1,921,225

UNITED STATES PATENT OFFICE 1,921,225

SPARE WHEEL LOCK

Walter L. Hawkins, St. Louis, Mo., assignor to Duro Metal Products Company, Chicago, Ill., a Corporation of Illinois Application September 24, 1930
Serial No. 484,015

8 Claims. (Cl. 70—90)

My invention relates to improvements in spare wheel locks and is more particularly concerned with the provision of a spare wheel lock of the type wherein the locking element is adapted to be applied over one of the locking nuts that hold the spare wheel upon its carrier.

It is a further object of my invention to provide a locking element of this type which is extremely simple in construction, yet capable of efficient performance.

A further object of my invention is to provide a locking element of this type which is easily removable and easily attached and one which can not be broken into without demolishing the locking element or a portion of the wheel.

The advantages of my improved locking device lie in the construction and arrangement of the parts hereinafter described and exemplified in the accompanying sheet of drawing, in which Fig. 1 is a vertical sectional view of an automobile wheel and tire of a well-known type, locked upon a tire carrier which may be provided upon the rear of an automobile;

Fig. 2 is a side elevational view of the parts shown in Fig. 1;

Fig. 3 is a full-sized vertical sectional view through the lock element and associated parts, taken generally on the line 3—3 of Fig. 2 and looking in the direction of the arrows;

Fig. 4 is a vertical sectional view through the locking element, taken on the line 4—4 of Fig. 3 and looking in the direction of the arrows;

Fig. 5 is a changed position view of the parts shown in Fig. 3, illustrating the manner in which the locking element is withdrawn from the wheel retaining bolt and nut; and Fig. 6 is a vertical sectional view, taken on the line 6—6 of Fig. 3 and looking in the direction of the arrows.

In the embodiment of the invention shown in the drawing 10 represents a wire wheel consisting generally of a hub shell portion 12, spokes 14, and a tire carrying rim 16. The hub shell 12 is provided at its outer end with a closure cap 18 and is provided with an annular flange 20 at its inner end which is adapted to be placed over a complementary shaped support 22 upon the end of a tire carrier 24. The spare wheel is then securely fastened upon the support 22 by means of the usual wheel securing bolts 26 and nuts 28.

The construction as thus far described is well known in the art and provides the usual manner in which a spare wheel for an automobile is carried. However, it has been found that since the spare wheel 10 is carried upon the tire carrier 24 and is secured thereto only by means of the bolts 26 and nuts 28, it is an extremely simple matter to remove the nuts 28 and remove the spare wheel 10. To prevent the removal of spare wheels by unauthorized persons, locking means have been devised whereby it is necessary for a person wishing to remove the wheel to have a key to unlock some member which securely holds the spare wheel in position upon the tire carrier.

To this end I have devised a locking member adapted to overlie one of the nuts which is mounted on the studs extending through the hub shell of the spare wheel to prevent the unscrewing thereof, as a result of which the wheel cannot be removed.

The lock of my invention may comprise a cylindrical body member 30 which tapers at 32 toward one end. A lock tumbler barrel 34 is securely mounted in the forward end of the body 30 in a bore 36 which extends from end to end of the body member 30. The bore 36 is enlarged at 38 and slightly reduced at 40 where it is hexagonal in shape for a purpose which will be hereinafter described. The body member 30 is further provided at its rear end with a projecting lug 42 which in a locking position bears against the hub shell 12 and prevents rotation of the member 30.

For the purpose of cooperating with the locking member a special nut element 44 is provided to take the place of the usual nut 28. The nut 44 is hexagonal in contour, similar to the nut 28, and is adapted to enter hexagonal bore 40 of member 30. The nut 44 is provided with a tapped opening 46, a reduced opening 48 and a pair of vertical openings 50 which communicate with the opening 48. A pair of balls 52 are provided in the openings 50 and the edges 54 of the openings 50 are preferably slightly turned inwardly to form shoulders that prevent the balls 52 from falling out of the openings 50 while permitting them to project considerably from said openings. The nut 44 is further provided at one end with an upturned shoulder portion 56 and a tapered hole engaging edge 58. The lock 34 may be of any suitable construction, being provided with a flat locking finger 60 extending forwardly therefrom.

The lock member is assembled by first securely fastening the key-operated lock 34 in position in the opening 36. The nut 44 is then passed into opening 40 with the balls 52 pressed inwardly, as shown in Fig. 5, with the finger of the lock 34 also in the position shown in Fig. 5. Nut 44 is pressed into the member 30 until its edge strikes the shoulder 62 of the opening 38, at which time the key 64 may be employed to rotate finger 60, pressing the balls 52 outwardly against the edge of the opening 38. The key may now be withdrawn and it will be seen that the body member 30 and the nut 44 have been locked together by means of the finger 60 and the balls 52 which prevent the body member 30 from being withdrawn from nut 44. Due to the fact that the cylindrical body member 30 is provided with lug 42, which effectively prevents the body member 30 from being rotated, it will be seen that the nut 44 cannot be rotated so long as body member 30 is associated with the nut. As a result, the wheel 10 is effectively locked to the tire carrier and can only be removed by a person supplied with the proper key 64 with which to turn the lock finger 60 to permit removal of the member 30 from the nut 44.

It will of course be understood that the body member 30 may be of an extremely hard metal capable of resisting the efforts of saws or chisels or similar instrumentalities.

The novelty of the invention lies in the arrangement of the parts and the cooperation therebetween, and it will be readily understood by those skilled in the art that the spare wheel lock is extremely simple in construction and operation and due to the few number of moving parts the device is capable of long and extensive use without becoming out of order or broken.

While I have illustrated and described a single embodiment of my invention, it will of course be understood by those skilled in the art that various changes and modifications may be made in the parts without departing from the spirit of my invention. It will also be readily apparent that the lock may be used for a great number of different purposes and I wish it to be strictly understood that I do not limit my invention to a locking means for spare wheels but rather, what I claim and desire to secure by Letters Patent of the United States is:

1. In a device of the class described, a housing having a passageway therethrough and provided with means to prevent its rotation, a key operated lock cylinder having an extending finger secured in said passageway, a nut element having an opening therethrough and threaded upon a bolt adapted to be removably entered into the passageway in said housing, and means carried by said nut actuated by said lock finger for interlocking said housing and said nut to prevent removal of the housing from the nut.

2. A spare wheel lock mechanism including a spare wheel carrier, a spare wheel having a hub shell secured thereto by bolts and nuts, a special nut for one of said bolts, and a housing adapted to be locked upon said special nut so as to substantially enclose the non-round surface thereof to prevent removal of same from its bolt, said housing being adapted to engage said shell to prevent its rotation.

3. A spare wheel lock mechanism including a spare wheel carrier, a spare wheel having a hub shell secured to said carrier by a plurality of bolts and nuts, a special nut for one of said bolts, a removable housing adapted to enclose said special nut and adapted to engage said hub shell to prevent its rotation, and a lock carried by said housing whereby it may be secured to said special nut.

4. The combination of a wheel, a hub shell thereon, a wheel carrier having a portion engageable with said hub shell, a plurality of fastening means removably securing the hub shell and wheel carrier together, a bolt passing through openings in said hub shell and said wheel carrier, a nut element adapted to threadedly engage said bolt to secure said wheel on said carrier, a lock carrying member engaging said nut, a key operated lock finger in said member, and means carried by said nut actuated by said lock finger for interlocking said lock member and said nut.

5. Means for locking a spare wheel having a hub member upon a carrier by the use of bolts and nuts, comprising a special nut for one of said bolts, a removable enclosing member overlying said nut, a lock finger on said member, and movable means carried by said nut adapted to be actuated by said lock finger to securely lock said member over said special nut to prevent access thereto.

6. A lock comprising a bolt, a nut threaded on said bolt, a casing surrounding said nut, key operated means for securing said casing around said nut, said key operated means comprising a locking finger adapted to be rotated in said casing, a pair of balls in openings in said nut adapted to be moved outwardly by said locking finger to secure said casing around said nut to prevent access thereto.

7. In combination with a nut having a bore therethrough and a pair of radial openings extending from said bore, a pair of ball members movable in said radial openings, a hardened body member having a socket adapted to receive said nut, a key operated lock member in said body member, and a finger on said lock member passing into the bore of said nut and adapted upon locking movement to move the ball members outwardly into an enlarged chamber in said body member to lock said member over said nut.

8. In a device of the class described, a nut having a bore therethrough and a plurality of radial openings extending from said bore, ball like members positioned in said radial openings, a lock carrying body member having a longitudinal bore adapted to be moved over said nut, and a key operated lock finger in said member adapted to be rotated to move said ball members outwardly into an enlarged chamber in said body member to secure the nut and the body member together to prevent access to said nut.

WALTER L. HAWKINS.